United States Patent [19]
Sendlinger et al.

[11] Patent Number: 4,736,074
[45] Date of Patent: Apr. 5, 1988

[54] ARRANGEMENT FOR THE TRANSMISSION OF DATA

[75] Inventors: Harald Sendlinger, Feldkirchen-Westerham; Wolfgang Wiesner, Germering, both of Fed. Rep. of Germany

[73] Assignee: Siemens Aktiengesellschaft, Berlin and Munich, Fed. Rep. of Germany

[21] Appl. No.: 20,837

[22] Filed: Mar. 2, 1987

[30] Foreign Application Priority Data

Apr. 18, 1986 [DE] Fed. Rep. of Germany ....... 3613182

[51] Int. Cl.⁴ .............................................. H04L 13/08
[52] U.S. Cl. .................................... 178/17 R; 178/17.5
[58] Field of Search .............. 178/17, 17.5, 2 R, 17 C, 178/3; 375/718

[56] References Cited
U.S. PATENT DOCUMENTS 3,936,600  2/1976  Galbraith ........................ 178/17.5
4,477,695  10/1984  Buck ................................ 178/3

Primary Examiner—Stafford D. Schreyer
Attorney, Agent, or Firm—Hill, Van Santen, Steadman & Simpson

[57] ABSTRACT

For the transmission of data between a terminal device, which preferably comprises a personal computer, and a remote subscriber via a transmission link, in particular a teleprinter line, a transmission unit is arranged between the terminal device and the transmission link. The printer of the terminal device is also connected to the transmission unit. In addition to a transmitting/receiving unit, the transmission unit contains a control unit which is provided with a transfer device in order that the printer, as an output unit, can be supplied even with the data emitted from the terminal device in a local operating mode or with data transmitted via the transmission link. The control unit can additionally contain storage units and code converters.

19 Claims, 2 Drawing Sheets

ARRANGEMENT FOR THE TRANSMISSION OF DATA

BACKGROUND OF THE INVENTION

1. Field of the Invention

The present invention relates to an arrangement for the transmission of data, using a terminal device, a transmission unit which is connected to a transmission link, and an output unit, in which a transmission state the terminal device is connected via the transmission unit to the transmission link.

2. Description of the Prior Art

For transmission of data it is generally known to use teleprinters by way of which data can be transmitted across the world-wide telex network with a high service quality in terms of availability, security and recognition, as a legally valid transmission.

It is also possible to connect a terminal device such as, for example, a personal computer, text system or data processing system, to the teleprinter at an additional interface, such as, for example, an additional telecommunications socket, by way of an additional device. The teleprinter is therefore attached to the main teleprinter terminal and the terminal device is merely looped in. Therefore, this solution requires a complete teleprinter and the additional device, in addition to the terminal device.

A further possibility resides in connecting a terminal device, such as, for example, the personal computer, directly to the transmission link by way of another additional device. In this case, however, the service quality usually expected of the teleprinter network can be maintained only if a teleprinter, or at least a monitor printer, is connected in addition to the terminal device. Only in this case is it ensured that received communications can be printed even when the terminal device is unavailable.

The above-described devices required a relatively high expense in order to achieve the required service quality.

SUMMARY OF THE INVENTION

Therefore, the object of the present invention is to provide an arrangement for the transmission of data, in which, using an existing terminal device, data can be transmitted across a transmission link, in particular a teleprinter network, maintaining a very high level of service quality.

According to the invention, the above object is realized, in an arrangement of the type generally set forth above which is particularly characterized in that the transmission unit comprises a control unit which, in the transmission mode, connects the terminal device to the transmission link and to the output unit and which, in a local operating mode, connects the transmission link to the output unit or, if the output unit is being used by the terminal device, to a memory.

An arrangement constructed according to the present invention has the advantage that the existing components of a terminal device, such as keyboard, screen, printer, external memories and control unit, can additionally be used for the transmission of data. The specific functions relating to transmission are fulfilled by the utilization of the transmission unit, while maintaining the previous service quality. The termination of the transmission link is independent of the terminal device and neither an additional printer nor an additional monitor printer are needed.

The arrangement proves particularly advantageous if the terminal device comprises a personal computer. In this case, it is favorable for the transmission unit to be connected in each case via a conventional interface to the output unit and to the terminal device. Here, the output unit advantageously comprises a printer. This printer then serves both as a printer for the terminal device and as a printer for the receive data. The transmission unit can also only be connected to the printer. In this case, the printer and the transmission unit serve exclusively as a receiving unit for the transmitted data.

The printer can consist of the printer normally provided in a terminal device, in which case the transmission unit is simply connected into the connection path between a control unit of the terminal device and the printer.

The arrangement can be used with particular advantage when the transmission link is a teleprinter transmission link, for example a teleprinter line.

In order to ensure that the output of data on the output unit is not disturbed in the local operating mode of the terminal device, it is favorable for the transmission unit to be provided with a line memory in which data received from the transmission link can be stored for such time as the terminal device is connected to the output unit. This line memory can be protected against power supply failure by accumulator buffering. When the power supply voltage is restored, data still contained in the memory are automatically printed out.

As the terminal device in the normal manner receives and transmits the data in a code which differs from the code used on the transmission link, it is advantageous for the transmission unit to contain a code converter in order to convert data emitted from the terminal device and/or data received from the transmission link into a code suitable for transmission or processing. When a teleprinter transmission link is used, this code consists, for example, of a conventional teleprinter code.

In order to check the data to be transmitted, which has been fed to the transmission link, it is advantageous that this data should be looped back in the transmission unit as received data and emitted to the output unit.

If it is necessary to exchange code in transmission, it is favorable for this exchange to take place, not in the terminal device, but in the transmission unit, and that for this purpose the transmission unit should contain a code generator which, having received an appropriate request, emits the data assigned to the code.

For the control of the selection and transmission procedure it is advantageous for the transmission unit to contain an analysis stage which analyzes the control characters emitted from the terminal device and controls the selection and transmission procedures.

As the transmission speed of the data on the transmission link in the normal manner will be lower than the transmission speed at which the data is emitted from the terminal device, it is advantageous for the transmission unit to contain a buffer by way of which the transmission speed of the data emitted from the terminal device can be matched to the transmission speed of the transmission speed. In order not to block the terminal device for the duration of the entire output procedure from the output unit, it is also advantageous for the transmission unit to include a further buffer (spooling buffer).

If data are received via the transmission link and output on the output unit, the terminal device is informed via a control line that the present time data cannot be output on the output unit.

If the output unit is used by the terminal device and data is simultaneously received via the transmission link, it is expedient for the transmission unit to include a buffer which stores the received data.

To ensure that data can continue to be received when the terminal device is disconnected, it is provided that the output unit remains connected and the transmission link remains connected to the output unit. It is also advantageous to include in the transmission unit operating aids, such as, for example, devices for automatically dialing, automatically redialing or for abbreviated dialing.

The transmission unit is normally accommodated in a separate housing. However, it is also possible to integrate the transmission unit into the terminal device, for example the personal computer, or into the output unit, so that it forms a structural unit with the aforesaid devices.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
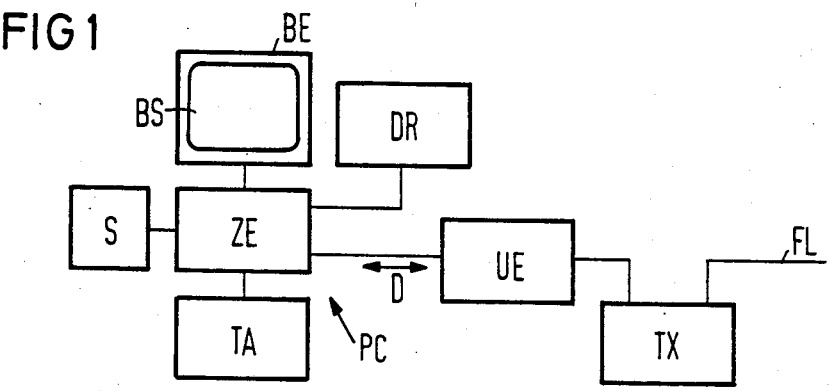
FIG. 1 is a block diagram of a first known embodiment of an arrangement for the transmission of data.

In a first embodiment, represented in FIG. 1, of an arrangement for the transmission of data, a teleprinter TX is connected to a transmission link in the form of a trunk line FL. At an additional input, for example the telecommunications additional socket, a transmission unit UE is connected, which is itself connected to a terminal device PC, for example a personal computer, a text processing device or a data processing system. The terminal device PC comprises a central unit ZE which is connected to a screen unit BE, provided with a screen BS, a keyboard TA and an output unit in the form of a printer DR. Data to be transmitted can be available by way of the terminal device PC, and can then be emitted via the transmission unit UE and the teleprinter TX to the trunk line. As a part of its preparation, this data D is also printed on the printer DR. It is likewise possible for the data D received on the trunk line FL to be fed via the teleprinter TX and the transmission unit UE to the terminal device PC where it is likewise output on the printer DR. The teleprinter TX is required in order that, regardless of the serviceability of the terminal device PC, i.e. even when the terminal device PC is defective or disconnected, reception can still take place and a clearly-defined termination of the trunk line FL is still ensured.

Figure 2:
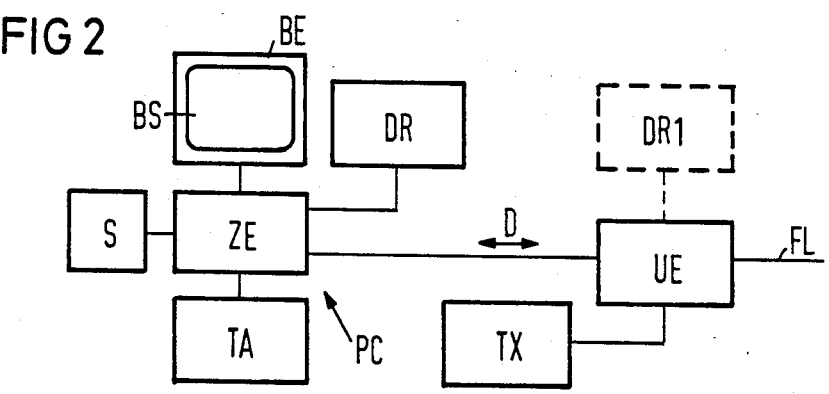
FIG. 2 is a block diagram of a second embodiment of a known arrangement for the transmission of data.

In the arrangement represented in FIG. 2, the transmission link, which is in the form of a trunk line FL, is connected to a transmission unit UE which is likewise connected to a terminal device PC, again preferably in the form of a personal computer. The terminal device PC is likewise formed, for example, by a central unit ZE, a screen unit BE with a screen BS, a printer DR, a keyboard TA and a peripheral memory S. The transmission unit UE is also connected to a teleprinter TX which ensures permanent availability. It is also possible to additionally connect the transmission unit UE to a monitor printer DR1 which constantly logs the incoming and outgoing messages. If the high-level of service quality is not required, the printer DR1 and the teleprinter TX can be omitted.

The arrangement illustrated in FIG. 2 requires a relatively high expense since many components are required in order to maintain the desired level of service quality. In particular, in this arrangement, as in the arrangement shown in FIG. 1, a teleprinter TX is required in addition to the terminal device PC.

Figure 3:
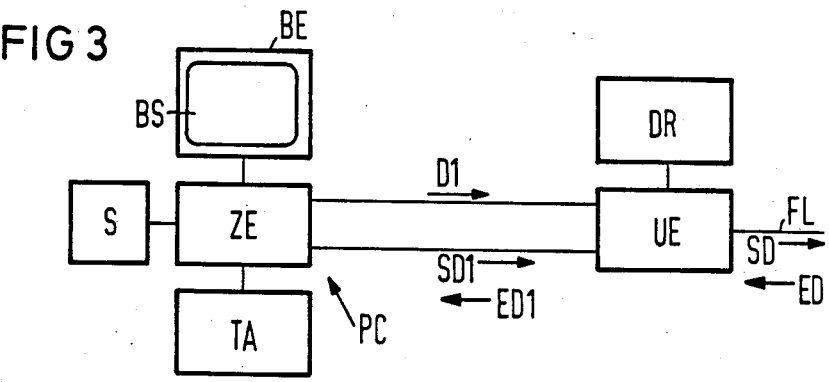
FIG. 3 is a block circuit diagram of an arrangement for the transmission of data constructed in accordance with the present invention.

In the arrangement illustrated in FIG. 3, however, a transmission unit UE is connected to the transmission link FL, but here no teleprinter is required and the transmission unit UE is connected to an output unit which comprises, in particular, a printer DR and which serves both as a printer for logging the data to be transmitted SD and the received data ED, and also as a printer for the terminal device PC. The terminal device PC, which again preferably comprises a personal computer, is connected to the transmission unit UE. In contrast to the terminal devices PC represented in FIGS. 1 and 2, in the case of the terminal device PC represented in FIG. 3 no individual printer is required and the terminal device need only be equipped, for example, with the central unit ZE, the screen unit BE comprising the screen BS, the keyboard TA and the memory S. Therefore, the printer DR is also supplied by the terminal device PC with data D1 which occurs in the local operating mode of the terminal device PC. The transmission unit UE includes a transfer unit which selectively supplies the printer DR with the transmitted data SD1, the received data ED1 or the data D1 emitted from the terminal device PC.

Figure 4:
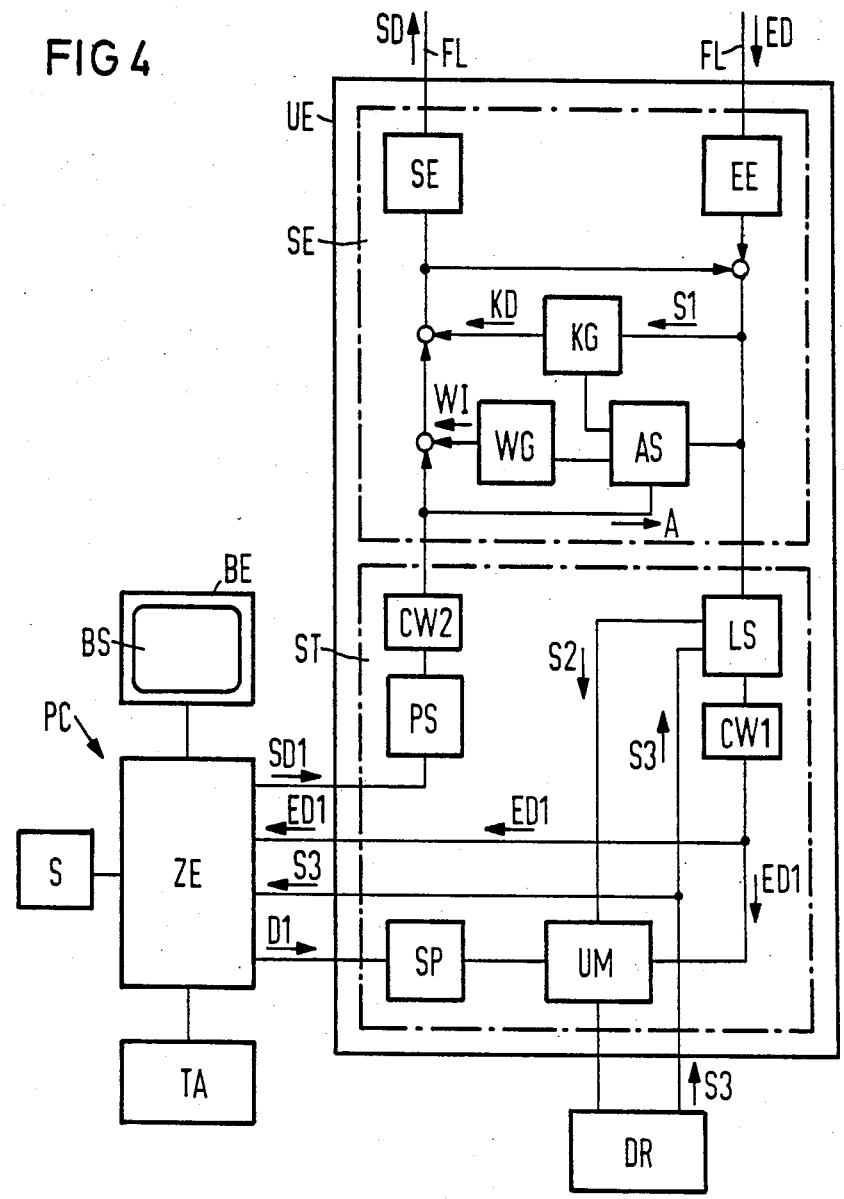
FIG 4 is a detailed block circuit diagram of the arrangement according to the present invention.

The transmission unit UE represented in FIG. 4 serves as a standard line termination and contains a transmitting/receiving unit SE which is connected to the transmission link, consisting for example of a teleprinter line FL, and which ensures the line termination at a standard level of service quality and executes the selection and transmission procedures. The transmission unit UE also comprises a control unit ST which includes, in particular, a transfer unit UM which supplies the printer DR with the data SD to be transmitted, the received data ED or the data D1 emitted from the terminal device PC in the local operating mode.

During the local operating mode, in which the terminal device PC is used in a manner known per se and no data exchange takes place via the transmission link FL, the data D1 emitted from the terminal device PC can be output via the transfer unit UM in the control unit ST to the printer DR. The control unit ST can contain a memory SP in order to carry out a so-called spooling process, i.e. the terminal device PC must not be blocked during the entire printing process.

If, simultaneously to the local operating mode of the terminal device PC, received data ED is received via the transmission link FL, the received data ED passes via a receiving unit EE into a line memory LS. When the transmission unit UE is used for teleprinter transmission, a code generator KG is also supplied with a control signal S1 which requests the code generator KG to emit a code. The code generator KG emits code data KD via a transmitting unit SE, as transmitted data SD, to the remote subscriber. The received data are then transmitted and stored in the line memory LS. When the line memory LS becomes full, on the one hand the possibility exists of informing the transmitting subscriber station that the transmission unit UE is no longer ready to receive, which can be effective, for example, by a signal which simulates the end of a data carrier. The possibility also exists of informing the terminal device PC by a control signal S2 that the local operating mode is to be interrupted, so that the transfer unit UM connects the line memory LS to the printer DR in order to automatically print the data from the line memory LS on the printer DR, which serves as an output unit. The received data ED1 is then, on the one hand, supplied via the transfer unit UM to the printer DR and, on the other hand, can also be supplied to the terminal device PC where it can be stored, for example, in the memory S, or displayed on the screen unit BE.

Frequently, in a local operating mode of the terminal device PC, no printer DR is required. In this case, the data received via the transmission link FL can be immediately output to the printer DR. During this time, the terminal device PC has no access to the printer DR until the transmission of the data is concluded, so that the logging is not interrupted.

Since, for example when the transmission unit UE is connected to a trunk line FL, the received data ED is coded in accordance with the teleprinter code and the terminal device PC normally operates with another code, the control unit ST advantageously includes a code converter CW1 which subjects the received data ED received via the transmission link FL to a code conversion so that the received data ED1 can be readily fed to the central unit ZE. This can be achieved, for example, by supplying the printer DR with conventional power supply current via the transmission unit UE. In this case, the transmission unit UE is provided with an outlet socket.

When the arrangement is used to transmit data, for example as a transmitting teleprinter, the data from the keyboard TA or from the memory S are fed as transmitted data SD1 to a buffer PS provided in the control unit ST. The buffer PS primarily serves to convert the transmission speed, as normally the transmitted data SD1 are emitted at a higher transmission speed than it can be transmitted as transmitted data SD via the transmission link FL, in particular when the transmission link is a teleprinter line. In this case, the control unit ST must also be provided with a code converter CW2 which converts the transmitted data SD1 into a code suitable for transmission, for example the teleprinter code.

Prior to the transmission of data, an analysis stage AS receives corresponding control signals SV for the establishment of the connection to the remote subscriber. On the one hand, the analysis state AS can trigger the generation of dialing pulses WI in a dialing signal generator WG if, for example, the remote subscriber is selected by number pulse dialing. Otherwise, the dialing signal generator WG generates code selection signals. It can also be equipped with an automatic dialing device, an automatic redialing device and/or an abbreviated dialing device. The analysis stage AS can also trigger the code generator KG so that in the event of a code exchange the code data KD is transmitted via the transmitting unit SE. Therefore, the code is stored, not in the terminal device PC, but in the transmission unit UE. If, following the establishment of the connection to the remote subscriber, the data SD to be transmitted is transmitted, it is emitted from the terminal device PC via the buffer PS and the code converter CW2 and via the transmitting unit SE to the transmission link FL.

The logging of the transmitted data SD, SD1 can, on the one hand, be effected by switching through the transmitted data SD1 to the printer DR, either directly or via the buffer PS and the transfer unit UM. It is also possible, following the code conversion, to loop back the transmitted data SD1 to the receiving end where such data can be treated in a manner corresponding to the received data ED and fed via the transfer unit UM to the printer DR. Here, the looped-back transmitted data SD need not necessarily be fed through the line memory LS.

If, in a transmission mode, the arrangement receives data ED received via the transmission link FL and the terminal device PC is disconnected, or is not ready for operation, following the exchange of the code using the control signal SV, the received data ED is fed to the line memory LS. As the terminal device PC is not ready for operation, the transfer unit UM is set in such a manner that received data ED incoming into the line memory LS is immediately printed out on the printer DR. For this purpose, the received data ED is fed via the code converter CW1, as received data ED1, to the transfer unit UM and from the latter to the printer DR. It is also possible for the received data ED to be supplied to the transfer unit UM as received data ED1 bypassing the line memory LS. Therefore, in order to guarantee a high level of availability, the printer DR must remain connected even when the terminal device PC is disconnected, so that the received data ED1 can be immediately printed.

If the terminal device PC is ready for operation, the received data ED1 is also fed to the central unit ZE, so that it can be stored in the memory S or displayed on the screen BS.

If the printer DR is not ready for operation, a control signal S3 is generated and fed to the terminal device PC into the line memory LS. In this case, the received data ED are fed only in the line memory LS. The output of data from the terminal device PC on the printer DR is therefore impossible, but the terminal device PC can emit data, for example to the memory SP, in order to issue so-called spooling orders for subsequent printing.

The central unit ZE for the terminal device PC and printer DR are advantageously connected via generally known and where appropriate retrofit interfaces, for example the V24 interface, to the transmission unit UE. For example, the logging can then proceed in accordance with the S.19 standard. By way of the lines 108/2 a signal "teleprinter not ready/ready" can be supplied, and by way of a line 107 a signal "terminal device PC on/off" can be transmitted. The interfaces to the teleprinter DR and the terminal device PC can vary in design and, for example, can alternately consist of a parallel or series interface.

As already mentioned above, the dialing signal generator WG can contain additional devices which provide for automatic dialing, abbreviated dialing or automatic redialing. These additional devices are advantageously triggered by a control signal via the terminal device PC.

The transmission unit UE need not be accommodated as an independent unit in a separate housing, but can also form an integral structural unit with the terminal device PC or the printer DR.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In an arrangement for transmitting data using a terminal device, a transmission unit which is connected to a transmission link, and an output unit, in which in a transmission state the terminal device is connected via the transmission unit to the transmission link, the improvement comprising:
   a memory; and
   a control unit in said transmission unit which, in the transmission state, connects the terminal device to the transmission link and to the output unit and which, in a local operating state, selectively connects the transmission link to the output unit in its free state or to said memory in the busy state of the output unit.

2. The improved arrangement of claim 1, wherein: said terminal device comprises a personal computer.

3. The improved arrangement of claim 1, wherein: the output unit comprises a printer.

4. The improved arrangement of claim 3, wherein: said terminal device comprises said printer.

5. The improved arrangement of claim 4, and further comprising:
   a transmitting/receiving unit connected to said control unit.

6. The improved arrangement of claim 5, wherein: the transmission link comprises a teleprinter line.

7. The improved arrangement of claim 6, wherein: said control unit comprises a code converter for converting the data transmitted from the terminal device and the data transmitted from the transmitting/receiving unit into a code which is suitable for transmission via the transmission link and for processing in the terminal device and in the output unit.

8. The improved arrangement of claim 7, wherein: said control unit and said transmitting/receiving unit comprise means for utilizing teleprinter codes.

9. The improved arrangement of claim 8, wherein: a data loop connects the control unit to the transmitting/receiving unit so that data to be transmitted are looped back as received data and returned to the control unit.

10. The improved arrangement of claim 9, wherein: the transmitting/receiving unit comprises a code generator which is responsive to a request signal to emit data assigned to a predetermined code.

11. The improved arrangement of claim 10, wherein: the transmitting/receiving unit comprises an analysis stage connected to the terminal device for receiving control characters therefrom and emitting signals for controlling the selection and transmission procedure for the transmission unit.

12. The improved arrangement of claim 11, wherein: the control unit comprises a buffer for matching the data transmission speed of the terminal device to the transmission speed of the transmission link.

13. The improved arrangement of claim 12, wherein: the control unit comprises a further buffer which prevents blocking of the output process of the output unit in the local operating state of the terminal device.

14. The improved arrangement according to claim 13, and further comprising:
   a control line connecting the terminal device to the control unit for signaling the terminal device that the output unit is not available for the local operating state.

15. The improved arrangement of claim 14, wherein: said control unit comprises means for automatically connecting the output unit to the memory when the output unit is full.

16. The improved arrangement of claim 15, wherein: the control unit comprises means for connecting the transmitting/receiving unit to the output unit in response to disconnection of the terminal device.

17. The improved arrangement of claim 16, wherein: the transmitting/receiving unit comprises dialing means for automatically dialing, automatically redialing and abbreviated dialing operable in response to operation of the terminal device.

18. The improved arrangement of claim 17, wherein: the transmission unit is integrated with the terminal device.

19. The improved arrangement of claim 17, wherein: the transmission unit is integrated with the output unit.

* * * * *